US012786693B2

(12) United States Patent
Wang et al.

(10) Patent No.: US 12,786,693 B2
(45) Date of Patent: Nov. 3, 2026

(54) WIRELESS COMMUNICATION METHOD AND APPARATUS OF SUPPORTING ARTIFICIAL INTELLIGENCE

(71) Applicant: Lenovo (Beijing) Limited, Beijing (CN)

(72) Inventors: Jianfeng Wang, Beijing (CN); Mingzeng Dai, Shanghai (CN); Congchi Zhang, Shanghai (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 268 days.

(21) Appl. No.: 18/702,668

(22) PCT Filed: Oct. 22, 2021

(86) PCT No.: PCT/CN2021/125753
§ 371 (c)(1),
(2) Date: Apr. 18, 2024

(87) PCT Pub. No.: WO2023/065314
PCT Pub. Date: Apr. 27, 2023

(65) Prior Publication Data
US 2025/0016547 A1 Jan. 9, 2025

(51) Int. Cl.
*H04W 8/22* (2009.01)
*H04W 28/16* (2009.01)

(52) U.S. Cl.
CPC ............ *H04W 8/22* (2013.01); *H04W 28/16* (2013.01)

(58) Field of Classification Search
CPC ....... H04W 8/22; H04W 28/16; H04W 24/02; G06N 3/08; G06N 20/00
See application file for complete search history.

(56) References Cited

U.S. PATENT DOCUMENTS

2016/0198452 A1 7/2016 Takahashi et al.
2020/0366326 A1 11/2020 Jassal et al.
(Continued)

FOREIGN PATENT DOCUMENTS

CN 103209403 A 7/2013
CN 108419230 A 8/2018
(Continued)

OTHER PUBLICATIONS

"Extended European Search Report", EP Application No. 21961062.3, Jun. 11, 2025, 12 pages.
(Continued)

*Primary Examiner* — Md K Talukder
(74) *Attorney, Agent, or Firm* — FIG. 1 Patents

(57) ABSTRACT

Embodiments of the present application relate to a wireless communication method and apparatus of supporting artificial intelligence. An exemplary method may include: transmitting a capability request message from a master node to a slave node of the master node, wherein, the master node is configured to have an authorization to manage the slave node, and the capability request message at least inquires whether AI capability for communication is supported in the slave node; and receiving a capability report message from the slave node by the master node, wherein the capability report message at least reports whether the AI capability for communication is supported in the slave node.

20 Claims, 8 Drawing Sheets

(56) References Cited

U.S. PATENT DOCUMENTS

| | | | | |
|---|---|---|---|---|
| 2021/0158151 | A1* | 5/2021 | Wang | G06N 3/02 |
| 2022/0322111 | A1 | 10/2022 | Zhang et al. | |
| 2023/0232213 | A1 | 7/2023 | Hong | |
| 2024/0298225 | A1* | 9/2024 | Hyde | H04W 36/0083 |
| 2024/0314592 | A1* | 9/2024 | Wang | H04W 24/02 |
| 2024/0340662 | A1* | 10/2024 | Kumar | H04W 76/20 |
| 2025/0016547 | A1* | 1/2025 | Wang | G06N 3/08 |

FOREIGN PATENT DOCUMENTS

| | | | |
|---|---|---|---|
| CN | 111819872 | A | 10/2020 |
| WO | 2020171803 | A1 | 8/2020 |
| WO | 2021048600 | A1 | 3/2021 |
| WO | 2021108082 | A1 | 6/2021 |
| WO | 2021128746 | A1 | 7/2021 |

OTHER PUBLICATIONS

Ericsson , "AI/ML based mobility optimization: Mobility performance feedback after HO", 3GPP TSG-RAN WG3 Meeting #113-e, R3-213780, retrieved from the internet on Jul. 10, 2024, <https://www.3gpp.org/ftp/tsg_ran/WG3_Iu/TSGR3_113-e/Docs>, Aug. 16, 2021, 9 pages.

PCT/CN2021/125753 , "International Preliminary Report on Patentability", International Application No. PCT/CN2021/125753, Apr. 23, 2024, 4 pages.

PCT/CN2021/125753 , "International Search Report and Written Opinion", International Application No. PCT/CN2021/125753, Jul. 8, 2022, 6 pages.

* cited by examiner

WIRELESS COMMUNICATION METHOD AND APPARATUS OF SUPPORTING ARTIFICIAL INTELLIGENCE

TECHNICAL FIELD

Embodiments of the present application are related to wireless communication technology, especially, related to artificial intelligence (AI) application in wireless communication, e.g., a wireless communication method and apparatus of supporting AI.

BACKGROUND OF THE INVENTION

AI, at least including machine learning (ML) is used to learn and perform certain tasks via training neural networks (NNs) with vast amounts of data, which is successfully applied in computer vison (CV) and nature language processing (NLP) areas. Deep learning (DL), which is a subordinate concept of ML, utilizes multi-layered NNs as an "AI model" to learn how to solve problems and/or optimize performance from vast amounts of data.

If AI models used on AI-based methods are well trained, the AI-based methods can obtain better performance than the traditional methods. Thus, 3rd generation partnership program (3GPP) has been considering to introduce AI into 3GPP since 2016, including several study items and work items in SA1, SA2, SA5 and RAN3. For example, introducing AI into physical (PHY) layer (e.g., RAN1) as a new study item in new radio (NR) release (R) 18 is under discussions, wherein one important issue concerns on how to determine a framework to evaluate and potentially deploy AI-based methods (or AI-assisted approaches) in wireless communication networks or systems for further standardization.

In addition, computation resources will be native resources and can be scheduled as a service, which is proposed in the latest 3GPP SA1 meeting for 6G. Related proposed objectives include measurement of computation resources and computation requirements, authentication and registration of 3rd party computation resources, discovery and utilization of computation capability for service, and scheduling management of computation resources, etc.

Therefore, to support AI in further long-term evolution (LTE) of radio access network (RAN), the industry needs to first define a standard framework, which is not only to evaluate the AI-based methods but also to involve related signalling, interfaces, procedures, etc.

SUMMARY

One objective of the embodiments of the present application is to provide a technical solution for wireless communication, especially for supporting AI in wireless communication.

Some embodiments of the present application provide an apparatus, e.g., a master node, which includes: at least one receiving circuitry; at least one transmitting circuitry; and at least one processor coupled to the at least one receiving circuitry and the at least one transmitting circuitry, wherein the at least one processor is configured to: transmit a capability request message from the master node to a slave node of the master node, wherein, the master node is configured to have an authorization to manage the slave node, and the capability request message at least inquires whether AI capability for communication is supported in the slave node; and receive a capability report message from the slave node by the master node, wherein the capability report message at least reports whether the AI capability for communication is supported in the slave node.

Some other embodiments of the present application provide an apparatus, e.g., a slave node, which includes: at least one receiving circuitry; at least one transmitting circuitry; and at least one processor coupled to the at least one receiving circuitry and the at least one transmitting circuitry, wherein the at least one processor is configured to: receive a capability request message from a master node of the slave node, wherein, the master node is configured to have an authorization to manage the slave node, and the capability request message at least inquires whether AI capability for communication is supported in the slave node; and transmit a capability report message from the slave node to the master node, wherein the capability report message at least reports whether the AI capability for communication is supported in the slave node.

Besides apparatus, some embodiments of the present application provide methods, e.g., a method, which includes: transmitting a capability request message from a master node to a slave node of the master node, wherein, the master node is configured to have an authorization to manage the slave node, and the capability request message at least inquires whether AI capability for communication is supported in the slave node; and receiving a capability report message from the slave node by the master node, wherein the capability report message at least reports whether the AI capability for communication is supported in the slave node.

In some embodiments of the present application, the master node is a base station (BS) and the slave node is a user equipment (UE), or the master node is a UE and the slave node is another UE, or the master node is a BS and the slave node is another BS, or the master node is a UE and the slave node is a BS.

In some embodiments of the present application, the capability request message further inquires one or more parameters associated with the AI capability for communication supported in the slave node, and the capability report message further reports the inquired one or more parameters by reporting corresponding one or more parameter values or corresponding at least one level of quantized one or more parameter values. According to some embodiments of the present application, the one or more parameters include at least one of following: peak floating-point operations per second (FLOPS); peak bandwidth to access a memory per second; memory size for an AI model, AI task and input/output data; energy consumption per operation; and penalty of interaction with local communication modules.

In some embodiments of the present application, the capability request message at least inquires whether the AI capability for communication is supported in the slave node by indicating a set of data and corresponding operations to the slave node, and the capability report message also indicates the test result of the set of data and corresponding operations in the case that the AI capability for communication is supported in the slave node.

In some embodiments of the present application, in the case that the AI capability for communication is supported in the slave node, the at least one processor in the master node is further configured to: transmit configuration information on resources and operations for at least one AI task to the slave node; and transmit the at least one AI task to the slave node after receiving an acknowledgement on the configuration information, wherein, the at least one AI task includes at least: data to be processed and operations on the data. According to some embodiments of the present applicationcation, the at least one processor in the master node is further configured to receive at least one of: acknowledge information on the at least one AI task, and result of the at least one AI task.

In some embodiments of the present application, the master node further includes an intelligent function entity including a management module, an AI computation module and an AI memory, wherein the management module is configured to manage the AI computation module and the AI memory. In some embodiments of the present application, the slave node further includes an intelligent function entity including a management module, an AI computation module and an AI memory, wherein the management module is configured to manage the AI computation module and the AI memory.

According to some embodiments of the present application, the AI computation module and the AI memory report at least one of following parameters of at least one AI model deployed in the AI computation module and the AI memory to the management module: number of multiply-accumulates (MACs); number of weights of a neural network; number of memory accesses; number of bytes per memory access; and interaction operational intensity.

In some embodiments of the present application, the intelligent function entity includes following interfaces: at least one interface for connecting with at least one local communication module; at least one interface for connecting with another intelligent function entity in at least one same kind of node; and at least one interface for connecting with another intelligent function entity in at least one other kind of node.

In some embodiments of the present application, in the case that the AI capability for communication is supported in the slave node, the at least one processor of the slave node is further configured to: receive configuration information on resources and operations for at least one AI task from the master node; and receive the at least one AI task from the master node after transmitting an acknowledgement on the configuration information, wherein, the at least one AI task includes at least: data to be processed and operations on the data. According to some embodiments of the present application, the at least one processor of the slave node is further configured to transmit at least one of: acknowledge information on the at least one AI task, and result of the at least one AI task.

Given the above, embodiments of the present application propose a novel framework for supporting AI in wireless communication, including various interfaces, signaling and procedures etc., which will facilitate the implementation of AI-based RAN.

BRIEF DESCRIPTION OF THE DRAWINGS

In order to describe the manner in which advantages and features of the present application can be obtained, a description of the present application is rendered by reference to specific embodiments thereof which are illustrated in the appended drawings. These drawings depict only exemplary embodiments of the present application and are not therefore intended to limit the scope of the present application.

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE, and so on. It is contemplated that along with the developments of network architectures and new service scenarios, all embodiments in the present application are also applicable to similar technical problems. Moreover, the terminologies recited in the present application may change, which should not affect the principle of the present application.

Figure 1:
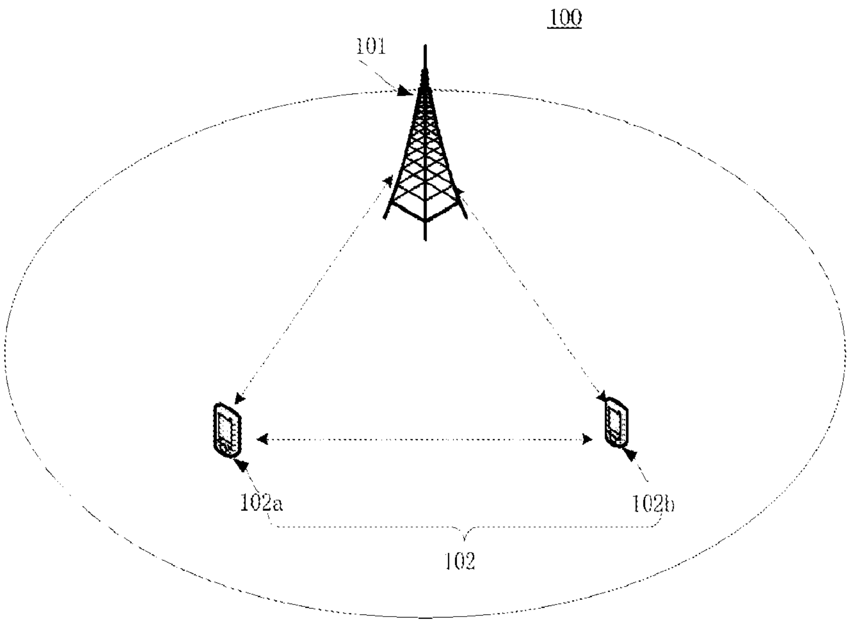
FIG. 1 is a schematic diagram illustrating an exemplary wireless communication system according to some embodiments of the present application.

FIG. 1 illustrates a schematic diagram of an exemplary wireless communication system 100 according to some embodiments of the present application.

As shown in FIG. 1, the wireless communication system 100 includes at least one BS 101 and at least one UE 102. In particular, the wireless communication system 100 includes one BS 101 and two UE 102 (e.g., a first UE **102*a* and a second UE 102*b*) for illustrative purpose. Although a specific number of BSs and UEs are illustrated in FIG. 1 for simplicity, it is contemplated that the wireless communication system 100** may include more or less BSs and UEs in some other embodiments of the present application.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The BS 101 may communicate with a core network (CN) node (not shown), e.g., a mobility management entity (MME) or a serving gateway (S-GW), a mobility management function (AMF) or a user plane function (UPF) etc. via an interface. A BS also be referred to as an access point, an access terminal, a base, a macro cell, a node-B, an enhanced node B (eNB), a gNB, a home node-B, a relay node, or a device, or described using other terminology used in the art. In 5G NR, a BS may also refer to as a radio access network (RAN) node. Each BS may serve a number of UE(s) within a serving area, for example, a cell or a cell sector via a wireless communication link. Neighbor BSs may communicate with each other as necessary, e.g., during a handover procedure for a UE.

The UE 102, e.g., the first UE 102*a* and second UE 102*b* should be understood as any type terminal device, which may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE may include wearable devices, such as smart watches, fitness bands, optical head-mounted displays, or the like. Moreover, the UE may be referred to as a subscriber unit, a mobile, a mobile station, a user, a terminal, a mobile terminal, a wireless terminal, a fixed terminal, a subscriber station, a user terminal, or a device, or described using other terminology used in the art.

Although 3GPP has been considering introducing AI capability (or application) for communication since 2016, how to introduce AI capability into PHY is still a new study item, which may be discussed in NR R18. So far, all frameworks or architectures proposed for AI-based RAN are just high-level descriptions without any detailed structure in PHY, especially the interfaces between isolated nodes, joint optimization on computation and communication in distributed AI over wireless communication systems, etc.

At least to solve the above technical problems, embodiments of the present application propose a technical solution associated with AI application in a wireless communication system (or network), especially propose a flexible framework for PHY enhancement for AI-based RAN, including relevant interfaces, signaling and procedures etc., to well support AI capability in a wireless communication system. In addition, based on the proposed framework, the computation resources for AI can also be well managed for future computation resource scheduling, especially for the complexity-sensitive physical layer. Herein, the wording "AI" at least includes ML, which may be also referred to as AI/ML etc.

According to embodiments of the present application, a node, e.g., a BS or a UE in a wireless communication network can be classified as a master node or a slave node, wherein the master node is configured to have an authorization to manage the slave node. That is, for two specific nodes in a wireless communication network, if a first node of the two nodes is configured to have an authorization to manage the second node of the two nodes, then the first node of the two nodes is a master node, and the second node is the slave node of the master node. Either a BS or a UE can be configured to be a master node or slave node. For example, the first node may be a BS and the second node may be another BS or a UE. In another example, the first node may be a UE and the second node may be a BS or another UE. Persons skilled in the art should understand that there may be more than one master node and more than one slave node in a wireless communication network, a master node may be authorized to manage more than one node and thus have more than one slave node, and a slave node may be managed by more than one node and thus have more than one master node. In the case that computation power is considered, a node with stronger computation power can be configured as a master mode of a node with weak computation power. For example, a gNB may be a master node of a UE being mobile phone in some embodiments, while a server having stronger computer power may be a master node of a gNB in some other embodiments.

According to some embodiments of the present application, configurations on the AI capability for communication of a slave node can be collected from the slave node by a master node and stored in the master node, which may act as a center scheduler. Such a procedure for collecting configurations on the AI capability for communication of at least one slave node can also be referred to as an initialization procedure for supporting AI in wireless communication.

Figure 2:
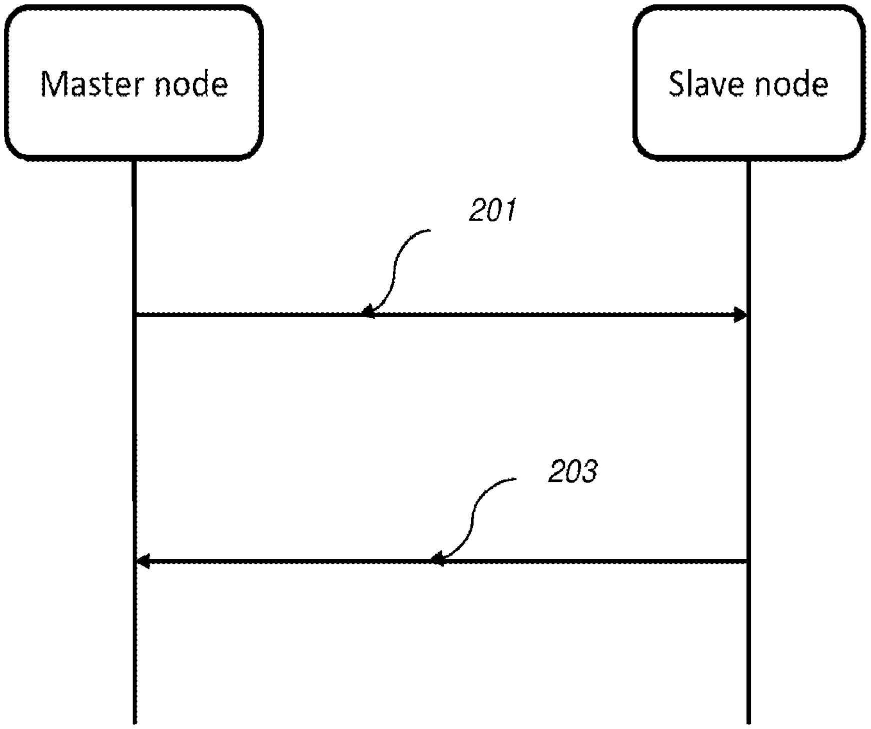
FIG. 2 is a flow chart illustrating an exemplary procedure of a wireless communication method of supporting AI according to some embodiments of the present application.

FIG. 2 is a flow chart illustrating an exemplary procedure of a wireless communication method of supporting AI according to some embodiments of the present application. Although the method is illustrated in a system level by a master node, e.g., a gNB and a slave node of the master node, e.g., a UE in a wireless communication network, persons skilled in the art can understand that the method implemented in the master node and that implemented in the slave node can be separately implemented and incorporated by other apparatus with the like functions.

As shown in FIG. 2, the master node may transmit a capability request message, e.g., request_ai_capability to a slave node of the master node in step 201. The capability request message at least inquires whether AI capability for communication is supported in the slave node. Accordingly, after receiving the capability request message, the slave node may transmit a capability report message, e.g., report_ai_capability to the master node in step 203. The capability report message at least reports whether the AI capability for communication is supported in the slave node. If the AI capability for communication is supported in the slave node, the slave node will report that the AI capability for communication is supported; otherwise, the slave node will report that the AI capability is not supported.

Herein, the capability request message and capability report message should be broadly understood to include any AI capability related request information and AI capability report information respectively, and should not be regarded as a single message transmitted once between the master node and slave node. Configuration information the AI capability for communication of a slave node can be collected from the slave node in various explicit or implicit manners including those illustrated below.

For example, in some embodiments of the present application, the capability request message may also inquire one or more parameters associated with the AI capability for communication supported in the slave node, so that the master node can estimate the AI capability for communication supported in the slave node for further management. The slave node will collect the required one or more parameters and report them to the master node (if any), e.g., in the capability report message.

According to some embodiments of the present application, the one or more parameters required by the master node can be used to describe the hardware capability of the slave node for the AI capability for communication. For example, the one or more parameters include at least one of following: FLOPS, peak bandwidth to access a memory per second, memory size for an AI model, AI task and input/output data, energy consumption per operation, and penalty of interaction with local communication modules. Table 1 lists these parameters in detail and their representative terms. Persons skilled in the art should understand that the representative terms are only used to describe the parameters for simplification and clarity, and should not be used to limit the substance of the parameters.

TABLE 1

| Parameters | Term |
|---|---|
| Peak floating-point operations per second (FLOPS) | $Thrpt_{core}$ |
| Peak bandwidth to access a memory per second (byte/sec) | $BW_{bus}$ |
| Memory size for an AI model, AI task and input/output data (byte) | $Mem_{ai}$ |
| Energy consumption per operation (J/op) | $E_{ops}$ |
| Penalty of interaction with local communication modules | $Pen_{c2c}$ |

Although parameters, $Thrpt_{core}$, $BW_{bus}$, $Mem_{ai}$, and $E_{ops}$ have been similarly defined in legacy AI technology, they are newly introduced for estimating the AI capability for communication. Regarding the parameter, $Pen_{c2c}$ it is totally novel. According to some embodiments of the present application, the parameter, $Pen_{c2c}$ is expressed as below:

$$Pen_{c2c}=\{BW_{c2c},E_{c2c}\}.$$

Where $BW_{c2c}$ (byte/sec) and $E_{c2c}$ (J/byte) denote the interaction bandwidth and the energy consumption per byte interaction, respectively. Thus, the latency and energy for interaction between the module(s) associated with AI capability for communication and local communication module in a slave node can be well described for management (including scheduling). For example, the PHY module in a node usually has different and dedicated processor units, e.g., digital signal processors (DSPs). By the parameter, $Pen_{c2c}$, penalty (or overhead) of the module(s) associated with AI capability for communication in the slave node interaction with local PHY module will be considered when the AI capability is used to enhance the physical layer.

In addition, the above parameters listed in Table 1 are proposed considering the main operations in an AI model, which are vector multiplying and adding and are much more different and simpler than the traditional operations for a general purpose. There are some other and more detailed values than the listed parameters, such as the penalty (or overhead) of direct memory access (DMA) and even remote DMA (RDMA) and hierarchical memory e.g., dynamic random access memory (DRAM), static random access memory (SRAM) and cache access, which can be further packaged into a full description table and reported by the slave node to the master node. In addition, the energy consumption would be also different for different operations, such as MAC and hierarchical memory access. They are all used to describe the basic hardware capability for the AI computation, which is to support improving the communication performance, instead of the entire capability in a slave node.

To obtain accurate parameters on the AI capability for communication of the slave node, the slave node may be configured to report the inquired one or more parameters by reporting corresponding one or more parameter values. For example, with the detailed values of parameters listed in Table 1, the overhead, e.g., latency and energy, on the AI operations in the slave node can be estimated at the master node.

Considering the overhead on reporting the inquired one or more parameters, the slave node may be configured to report corresponding at least one level of quantized one or more parameter values, rather than the accurate parameter values. For example, the values of parameters listed in Table 1 can be quantized and categorized with different levels, such as high, middle and low. Only the quantized parameter values as a set of categories are indicated in capability report message. Accordingly, the report overhead can be highly reduced with some quantization loss, and the overhead, e.g., latency and energy, on the AI operations in the slave node can also be estimated at the master node.

In some embodiments of the present application, the slave node may be configured to not report its parameters associated with AI capability for communication to the master node. The master node may inquire whether the AI capability for communication is supported in the slave node by indicating a set of data and corresponding operations to the slave node in the capability request message. In the case that the AI capability for communication is supported in the slave node, the slave node will transmit the capability report message indicating the AI capability for communication is supported in the slave node. The test result of the set of data and corresponding operations will also be indicated in the capability report message. For example, the master node may transmit a simple AI model to the slave mode, and the slave mode with the AI capability for communication will run the AI model to obtain the results including the latency and energy consumption to indicate its capability, and then report the result to the master node.

Based on collected the configurations on the AI capability for communication from the slave node, the master node may schedule the slave node, e.g., for computations. Such a procedure may also be referred to as a scheduling procedure for supporting AI in wireless communication.

Figure 3:
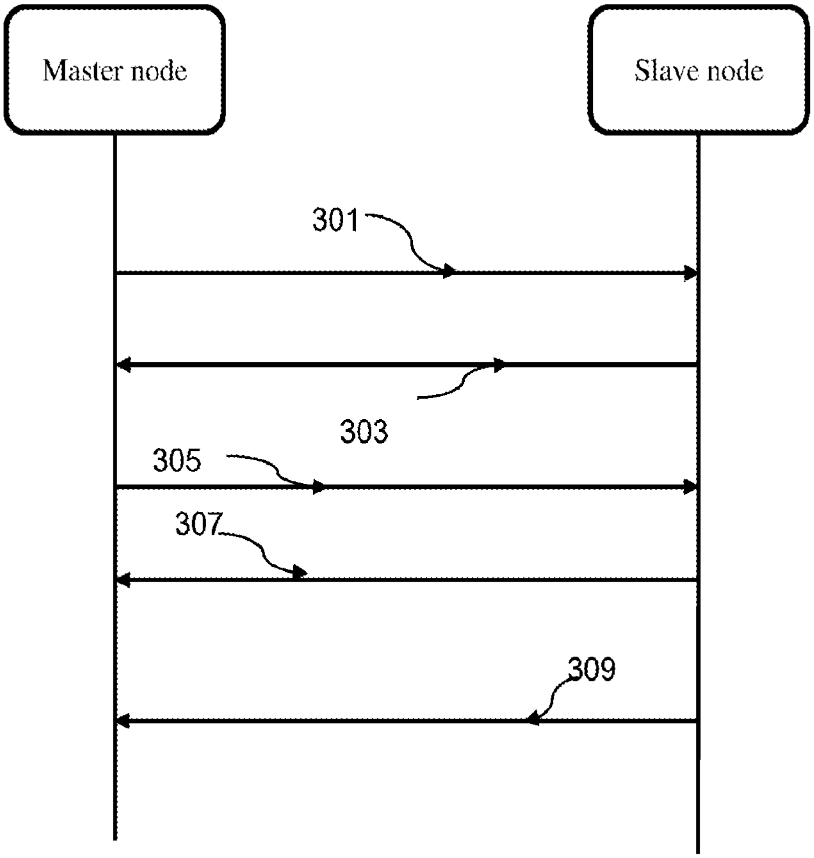
FIG. 3 is a flow chart illustrating an exemplary procedure of a wireless communication method of supporting AI according to some other embodiments of the present application.

FIG. 3 is a flow chart illustrating an exemplary procedure of a wireless communication method of supporting AI according to some other embodiments of the present application. Although the method is illustrated in a system level by a master node, e.g., a gNB and a slave node of the master node, e.g., a UE in a wireless communication network, persons skilled in the art can understand that the method implemented in the master node and that implemented in the slave node can be separately implemented and incorporated by other apparatus with the like functions.

As shown in FIG. 3, in some embodiments of the present application, in the case that the AI capability for communication is supported in the slave node, the master node may transmit configuration information on resources and operations for at least one AI task to the slave node in step 301. For example, the master node may transmit a message config_ai_resource to the slave node to indicate the configuration information on resources and operations for at least one AI task, which may include information indicating the input data and periodicity from a specific communication module for at least one AI task, e.g., channel state information (CSI) estimated from reference signals or the measured signaling noise ratio (SNR) values. The message config_ai_resource may also indicate the scale values on the parameters for describing the hardware capability associated with AI capability for communication, e.g., at least one the scale value on at least one parameter as listed in Table 1, which can be used as the least computation resources as the baseline for the following AI task.

After receiving the configuration information from the master node, the slave node may transmit an acknowledgement on the configuration information in step 303 if it agrees; otherwise, the slave node will not acknowledge the configuration information. For example, the slave node may transmit a message ack_config_ai_resource to the master node. In the case that the slave node agrees the configuration information, the message ack_config_ai_resource indicates the slave node acknowledges the configuration information. In the case that the slave node does not agree with the configuration information, the slave node may feed a suggestion on the scale values with further negotiations in the message ack_config_ai_resource.

In the case of receiving the acknowledgement from the slave node, the master node will transmit the at least one AI task explicitly or implicitly to the slave node in step 305. The at least one AI task at least includes: data to be processed and operations on the data. For example, the master node may transmit a message assign_ai_data to assign the at least one AI task to the slave node, which may include information indicating the whole or partial used AI model, including the construction and weights, and the information indicating the input, output and/or intermedia data of the AI model if needed. If the slave node supports distributed and/or federal learning, information indicating the stochastic gradient descent values of each min-batch training may also be transmitted to the slave node. After receiving the at least one AI task from the master node, the slave node will acknowledge the at least one AI task or not in step 307. For example, the slave node will acknowledge the assigned AI task if it agrees; otherwise, the slave node may feed a suggestion on the assigned AI task with further negotiations.

The master node may need the slave node to report the result(s) (or output) of the at least one AI task or not. If the result(s) is needed to be reported to the master node, the slave node will report the result(s) of the at least one AI task explicitly or implicitly in step 309. For example, the slave node may transmit the result(s) of the at least one AI task via a message report_ai_data, which includes the output data of the AI model as the results of the task. If the slave node supports distributed and/or federal learning, the reported result may also include the updated AI model and the stochastic gradient descent values in the distributed/federal learning. In some embodiments of the present application, the reported result may include the error between the ground truth and the training results for supervise learning.

Figure 4:
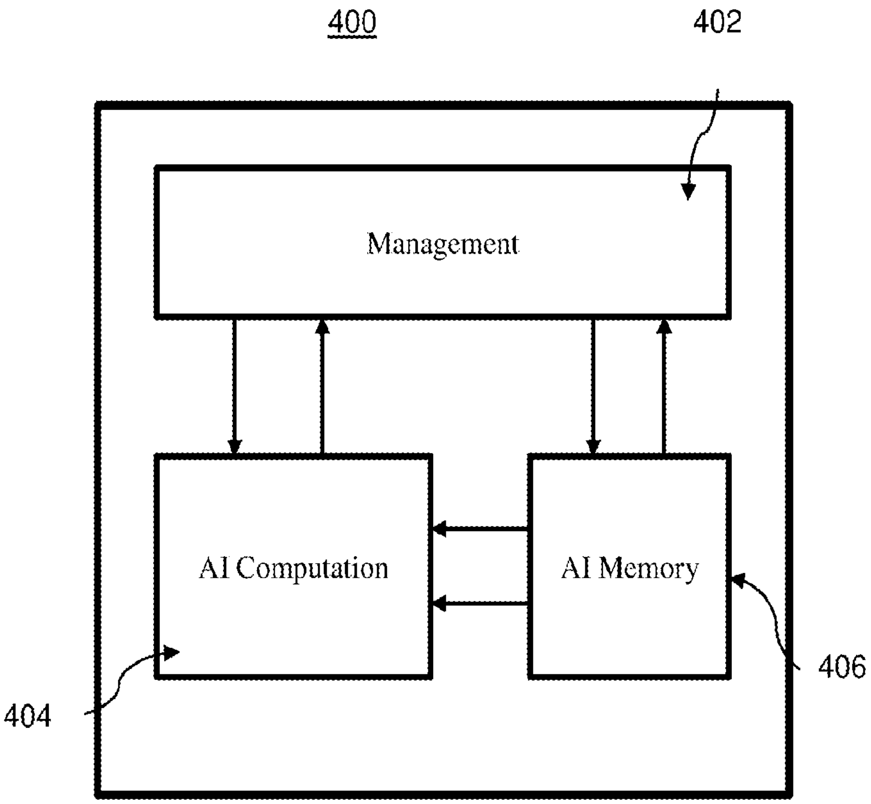
FIG. 4 illustrates a block diagram of an exemplary IF entity according to some embodiments of the present application.

Besides the methods of supporting AI in wireless communication, embodiments of the present application also proposes an apparatus of supporting AI in wireless communication. For example, to manage the AI capability for communication in a node, embodiments of the present application introduce an intelligent function (IF) entity in a node with AI capability for communication, e.g., a master node with AI capability for communication or a slave node with AI capability for communication. FIG. 4 illustrates a block diagram of an exemplary IF entity according to some embodiments of the present application.

As shown in FIG. 4, an exemplary IF entity 400 includes a management module 402, an AI computation module 404 and an AI memory 406. The AI computation module 204 and AI memory 206 may be not separate from other computation resources and memory of the node, while be a part of the entire computation hardware resources and memory of the node respectively, which is designed or configured for AI capability for communication in the node. According to some embodiments of the present application, the exemplary IF entity can manage all operations related with the AI capability for communication, such as the description, evaluation and configuration on the hardware resource (or hardware capability) and the used AI models (or software capability).

The management module 402 is configured to manage the AI computation module 404 and the AI memory 406, so that the AI capability for communication of the node with the IF entity is managed to jointly interact with the AI computation module 404 and AI memory 406. The AI computation module 404 and the AI memory 406 will report their respective descriptions for AI capability for communication to the management module 402, including hardware capability descriptions (or hardware descriptions) and software capability descriptions (or software descriptions). Based on their descriptions, the management module 402 may configure one or more AI tasks to the AI computation module 404 and the AI memory 406. For example, AI operations is highly described and extracted in the management module 402, and the AI computation module 404 and AI memory 406 can be configured by the management module 402 for at least one specific computation task, e.g., inference and/or training of an AI-based method.

The hardware capability of the IF entity can be described by one or more parameters, e.g., those illustrated in Table 1 or the like, which will not be repeated herein. Regarding the software descriptions, at least one of following parameters of at least one AI model deployed in the AI computation module and the AI memory may be reported to the management module: the number of MACs, the number of weights of a neural network; the number of memory accesses, the number of bytes per memory access, and interaction operational intensity. Table 2 lists these exemplary parameters for describing the software capability of AI capability for communication in a node in detail and their representative terms. Persons skilled in the art should understand that the representative terms are only used to describe the parameters for simplification and clarity, and should not be used to limit the substance of the parameters.

TABLE 2

| Parameters | Term |
|---|---|
| Number of multiply-accumulates (MACs) | $MAC_{model}$ |
| Number of weights of the neural network | $W_{model}$ |
| Number of memory accesses | $N_{acc}$ |
| Number of bytes per memory access (byte) | $M_{acc}$ |
| Interaction Operational Intensity (FLOPS/byte) | $IOp_{c2c}$ |

Although parameters, $MAC_{model}$, $W_{model}$, $N_{acc}$, and $M_{acc}$ have been defined for legacy AI technology, they are newly introduced for estimating the AI capability for communication. Regarding the parameter $IOp_{c2c}$, it is novel and the additional overhead to interact with the communication module is considered. Accordingly, the parameter $IOp_{c2c}$ can better support the complexity of AI to enhance communication modules than traditional operational intensity. Specifically, the parameter, $IOp_{c2c}$ is defined as follows:

Interaction Operational Intensity =

$$A \times MAC_{model} / (N_{acc} \times (\min(M_{acc}, BW_{c2c}))),$$

Where, A denotes the number of floating-point operations per MAC, and A=2 (FLOPs/MAC) is always assumed in general cases. In addition, A means operations per byte of storage traffic, defining total bytes accessed as those bytes that go to the main memory after they have been filtered by the cache hierarchy.

The IF entity can connect with other internal structure(s) (or module, or entity etc.) within the same node and/or outside structure(s) (or module, or entity etc.) in different node(s) via various interfaces. For example, an IF entity may have: at least one interface for connecting with at least one local communication module; at least one interface for connecting with another intelligent function entity in at least one same kind of node; and at least one interface for connecting with another intelligent function entity in at least one other kind of node.

Figure 5:
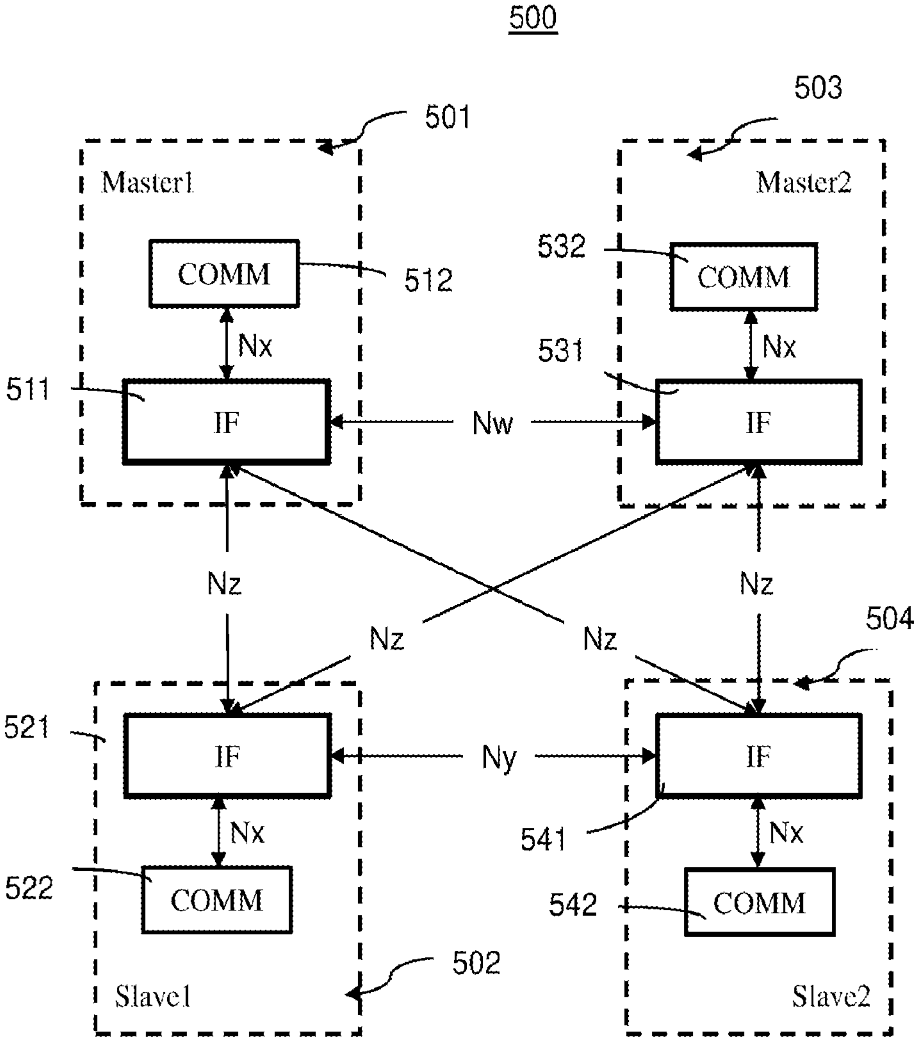
FIG. 5 illustrates a block diagram of a wireless communication network including a plurality of nodes with IF entity according to some embodiments of the present application.

FIG. 5 illustrates a block diagram of a wireless communication network including a plurality of nodes with IF entity according to some embodiments of the present application.

As shown in FIG. 5, four exemplary nodes, e.g., a first master node 501 (Master1), a second master node 502 (Master2), a first slave node 503 (Slave1) and a second slave node 504 (Slave2) are illustrated in the network 500. Each exemplary node includes an IF entity (IF) and at least one other module, e.g., a communication module (COMM) connected with the IF entity. Specifically, the first master node 501 at least includes IF 511 and COMM 512, the second master node 502 at least includes IF 521 and COMM 522, the first slave node 503 at least includes IF 531 and COMM 532, and the second slave node 504 at least includes IF 541 and COMM 542. Four exemplary kinds of interfaces of each IF entity, i.e., Nx, Ny, Nz and Nw are defined and classified according to the target structure to be connected with and the contents over it. Persons skilled in the art should understand that more kinds of interfaces can be defined for the IF entity in the future, and the terms Nx, Ny, Nz and Nw are only used to describe the interfaces for simplification and clarity, and should not be used to limit the substance of the interfaces.

Regarding Nx, it is an interface for an IF entity to connect with the local communication module in the same node, e.g., the interface between the IF entity with local PHY module. The contents over this interface may include: a) the data collected from the communication module as the inputs to at least one AI model (e.g., for training, testing or inference), and b) the data delivered to the communication module as the output of the at least one AI model. According to some embodiments of the present application, which kind of data, e.g., channel estimation results, channel quality indication or measurement results, and when to collect and/or deliver the data is determined by the management module in the IF entity. The metric to evaluate such interaction overhead is indicated as $Pen_{c2c}$ and $IOp_{c2c}$ as defined above.

Regarding Ny, it is an interface for an IF entity in a slave node to connect with the IF entity in other slave nodes, i.e., a slave node with another slave node. The contents over this interface may include: a) the AI-related data, e.g., training data, from and to the other nodes, and b) the configuration indication on the computation resource for at least one AI task. Whether the local data can be accessed or not is decided and negotiated in the management module in the IF entity, which may be managed by the IF entity in a managing master node via Nz interface as introduced below. The data transmission format and overhead is decided by the system interface, such as PC5 and X1/S1 interfaces defined in 3GPP LTE/NR.

Regarding Nz: it is an interface of an IF entity in a slave node to connect with the IF entity in other kind of nodes, i.e., slave node with master node. For example, the messages during the initialization procedure and scheduling procedure as illustrated above can be transmitted via Nz. This interface is used to manage the computation resource over the wireless communication system, which does scheduling according to the computation resource in each involved nodes and the communication interfaces. The contents over this interface may include: a) the descriptions on the AI capability for register and access; b) the AI-related data (e.g., training data, model); c) the configuration indication on the computation resource; and d) the tasks with data and/or the corresponding model indication.

Regarding Nw: it is an interface for an IF entity in a master node to connect with the IF entity in other master nodes, i.e., master node and master node. This interface is used to manage, negotiate and schedule the computation resources in different master modes. The content over this interface may include: a) the negotiation on the AI capability for communication of the serving slave nodes which is managed by an authorized master node; and b) the handover indications among the serving master nodes.

Figure 6:
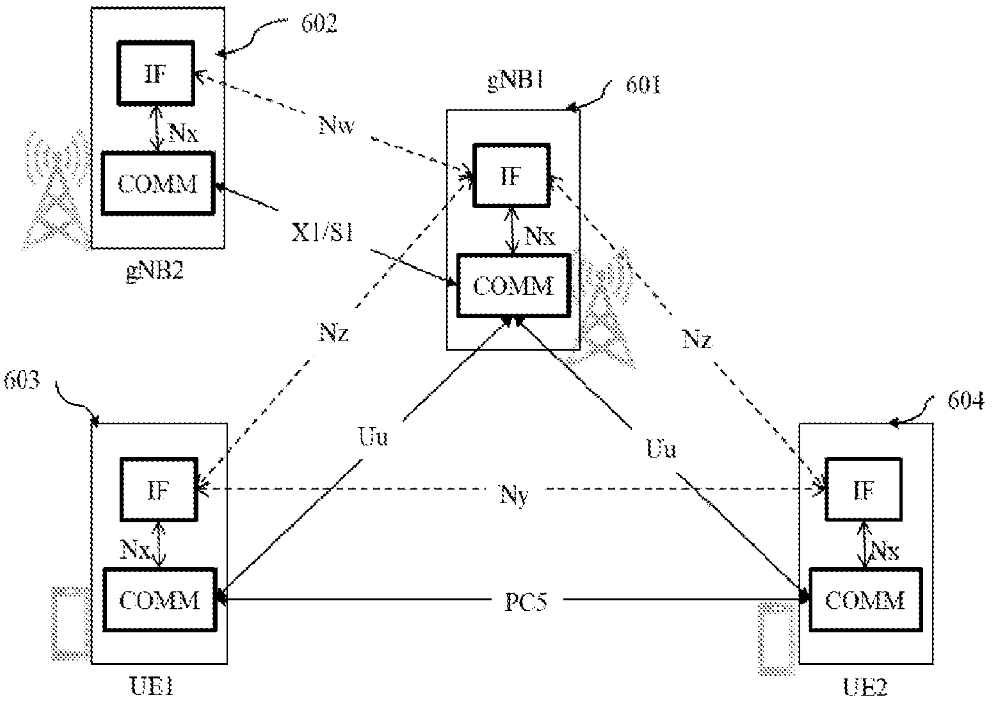
FIG. 6 illustrates an exemplary wireless communication network architecture according to some embodiments of the present application.

When being deployed into a 3GPP NR network or system, the IF entity can be flexibly located in arbitrary communication nodes. FIG. 6 illustrates an exemplary wireless communication network architecture according to some embodiments of the present application.

As shown in FIG. 6, there are four exemplary nodes, i.e., two BSs, e.g., a first gNB 601 (gNB 1) and a second gNB 603 (gNB2), and two UEs, e.g., a first UE 603 (UE1) and a second UE 604 (UE2). Each exemplary node includes an IF entity (IF) and at least one other module, e.g., a communication module (COMM) connected with the IF entity, wherein COMM is connected with IF via Nx. Thus, besides overlaid radio interfaces, e.g., X1/S1, Uu and PC5 etc., IF entities between two nodes are connected via proper dedicated interfaces, e.g., Ny, Nz and Nw as illustrated above. The transmission format and quality of such interfaces among IF entities are decided by the overlaid radio interfaces, e.g., Uu, PC5, X1/S1. Both gNB1 and gNB2 are master nodes, wherein gNB1 is configured as a master node of the slave nodes UE1 and UE2 to manage the computation resources and schedule the AI tasks to UE1 and UE2 via Nz interfaces. For example, the AI model distribution and aggregation can be done over the Nz interfaces between gNB1 and UE1 and UE2. In addition, the computation tasks can be also allocated by gNB1 to UE1 and UE2. Among the UEs, e.g., UE1 and UE2, the data for training and/or interference can be interacted. The AI model and computation resource and tasks can be negotiated between gNB1 and gNB2 via Nw interface.

Figure 7:
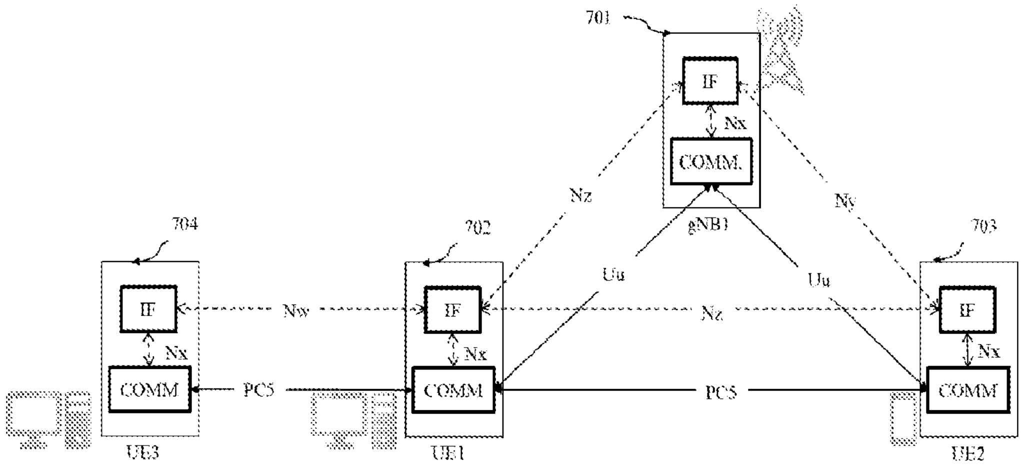
FIG. 7 illustrates an exemplary wireless communication network architecture according to some other embodiments of the present application.

FIG. 7 illustrates an exemplary wireless communication network architecture according to some other embodiments of the present application.

As shown in FIG. 7, there are four exemplary nodes, i.e., one BS, e.g., a gNB 701 (gNB 1), and three UEs, e.g., a first UE 702 (UE1), a second UE 703 (UE2) and a three UE 704 (UE3). Each exemplary node includes an IF entity (IF) and at least one other module, e.g., a communication module (COMM) connected with the IF entity, wherein COMM is connected with IF via Nx. Thus, besides overlaid radio interfaces, e.g., X1/S1, Uu and PC5 etc., IF entities between two nodes are connected via proper dedicated interfaces, e.g., Ny, Nz and Nw as illustrated above. The transmission format and quality of such interfaces among IF entities are decided by the overlaid radio interfaces, e.g., Uu, PC5, X1/S1. Both UE1 and UE3 are computation devices with strong computation power, e.g., servers etc., and thus are configured as master nodes to schedule the computation resources, wherein UE1 is configured as a master node of the slave nodes gNB1 and UE2 to manage the computation resources and schedule the AI tasks to gNB1 and UE2 via Nz interfaces. For example, the AI model distribution and aggregation can be done over the Nz interfaces between UE1 and gNB1 and UE2. In addition, the computation tasks can be also allocated by UE1 to gNB1 and UE2. Among the slave nodes, e.g., gNB1 and UE2, the data for training and/or interference can be interacted. The AI model and computation resource and tasks can be negotiated between UE1 and UE via Nw interface.

Figure 8:
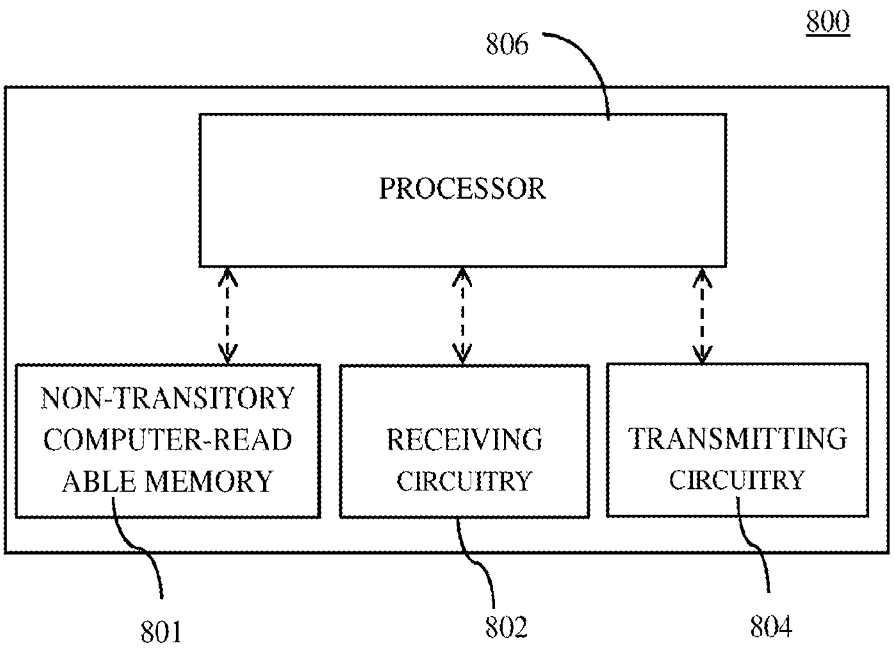
FIG. 8 illustrates a block diagram of a wireless communication apparatus of supporting AI according to some embodiments of the present application.

FIG. 8 illustrates a block diagram of a wireless communication apparatus of supporting AI 800 according to some embodiments of the present application.

As shown in FIG. 8, the apparatus 800 may include at least one non-transitory computer-readable medium 801, at least one receiving circuitry 802, at least one transmitting circuitry 804, and at least one processor 806 coupled to the non-transitory computer-readable medium 801, the receiving circuitry 802 and the transmitting circuitry 804. The at least one processor 806 may be a CPU, a DSP, a microprocessor etc. The apparatus 800 may be a master node or a slave node configured to perform a method illustrated in the above or the like.

Although in this figure, elements such as the at least one processor 806, transmitting circuitry 804, and receiving circuitry 802 are described in the singular, the plural is contemplated unless a limitation to the singular is explicitly stated. In some embodiments of the present application, the receiving circuitry 802 and the transmitting circuitry 804 can be combined into a single device, such as a transceiver. In certain embodiments of the present application, the apparatus 800 may further include an input device, a memory, and/or other components.

In some embodiments of the present application, the non-transitory computer-readable medium 801 may have stored thereon computer-executable instructions to cause a processor to implement the method with respect to the master node as described above. For example, the computer-executable instructions, when executed, cause the processor 806 interacting with receiving circuitry 802 and transmitting circuitry 804, so as to perform the steps with respect to the apparatus in the master node as depicted above.

In some embodiments of the present application, the non-transitory computer-readable medium 801 may have stored thereon computer-executable instructions to cause a processor to implement the method with respect to the slave node as described above. For example, the computer-executable instructions, when executed, cause the processor 806 interacting with receiving circuitry 802 and transmitting circuitry 804, so as to perform the steps with respect to the apparatus in the slave node as illustrated above.

Figure 9:
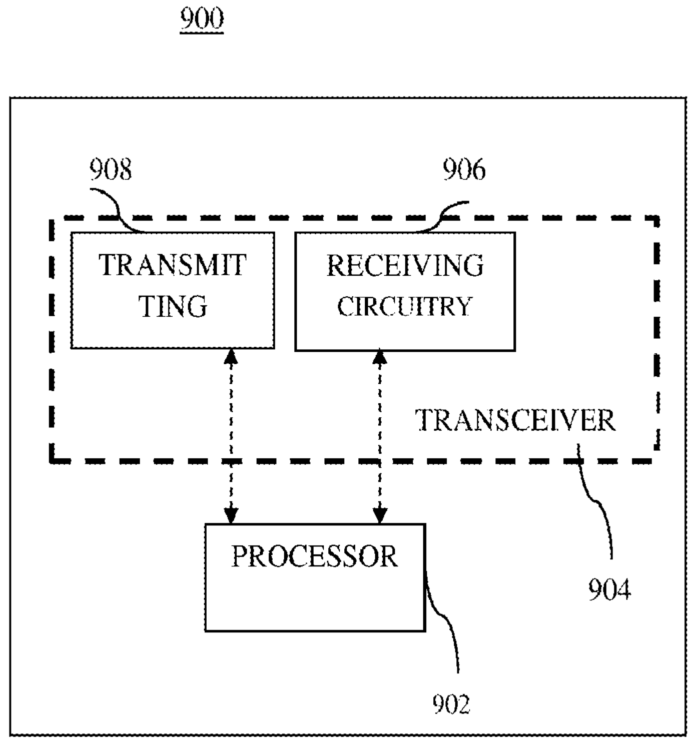
FIG. 9 illustrates a block diagram of a wireless communication apparatus of supporting AI according to some other embodiments of the present application.

FIG. 9 is a block diagram of a wireless communication apparatus of supporting AI 900 according to some other embodiments of the present application.

Referring to FIG. 9, the apparatus 900, for example a master node or a slave node may include at least one processor 902 and at least one transceiver 904 coupled to the at least one processor 902. The transceiver 904 may include at least one separate receiving circuitry 906 and transmitting circuitry 908, or at least one integrated receiving circuitry 906 and transmitting circuitry 908. The at least one processor 902 may be a CPU, a DSP, a microprocessor etc.

According to some embodiments of the present application, when the apparatus 900 is a master node, the processor is configured to: transmit a capability request message from the master node to a slave node of the master node, wherein, the capability request message at least inquires whether AI capability for communication is supported in the slave node; and receive a capability report message from the slave node by the master node, wherein the capability report message at least reports whether the AI capability for communication is supported in the slave node.

According to some other embodiments of the present application, when the apparatus 900 is a slave node, the processor may be configured to: receive a capability request message from a master node of the slave node, wherein, the capability request message at least inquires whether AI capability for communication is supported in the slave node; and transmit a capability report message from the slave node to the master node, wherein the capability report message at least reports whether the AI capability for communication is supported in the slave node.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus, including a processor and a memory. Computer programmable instructions for implementing a method are stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

In addition, in this disclosure, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "having," and the like, as used herein, are defined as "including."

What is claimed:

1. An apparatus for wireless communication as a first network node, the apparatus comprising:

at least one memory; and at least one processor coupled with the at least one memory and configured to cause the apparatus to:

transmit, to a second network node, a capability request message, the first network node configured with an authorization to manage the second network node, and the capability request message at least inquires whether artificial intelligence (AI) capability for communication is supported in the second network node, the capability request message inquiring one or more parameters associated with the AI capability for communication supported in the second network node for computations to schedule the second network node, wherein the one or more parameters are quantized and categorized with different levels; and receive, from the second network node, a capability report message that at least reports whether the AI capability for communication is supported in the second network node, the capability report message reporting the inquired one or more parameters that correspond to at least one level of the quantized and categorized one or more parameters.

2. The apparatus of claim 1, wherein at least one of:

the first network node is a base station and the second network node is a user equipment, or another base station; or the first network node is the user equipment and the second network node is another user equipment, or the base station.

3. The apparatus of claim 1, wherein the one or more parameters comprise at least one of:

peak floating-point operations per second (FLOPS);

peak bandwidth to access a memory per second;

memory size for an AI model, an AI task, and input/output data;

energy consumption per operation; or a penalty of interaction with local communication modules.

4. The apparatus of claim 1, wherein the capability request message at least inquires whether the AI capability for communication is supported in the second network node by indicating a set of data and corresponding operations to the second network node, and the capability report message indicates a test result of the set of data and the corresponding operations if the AI capability for communication is supported in the second network node.

5. The apparatus of claim 1, wherein, if the AI capability for communication is supported in the second network node, the at least one processor is further configured to cause the apparatus to:

transmit, to the second network node, configuration information about resources and operations for at least one AI task; and transmit the at least one AI task to the second network node after receiving an acknowledgement of the configuration information, wherein the at least one AI task comprises at least data to be processed and the operations on the data.

6. The apparatus of claim 1, further comprising an intelligent function entity including a management module, an AI computation module, and an AI memory, wherein the management module is configured to manage the AI computation module and the AI memory.

7. An apparatus for wireless communication as a second network node, the apparatus comprising:

at least one memory; and at least one processor coupled with the at least one memory and configured to cause the apparatus to:

receive, from a first network node, a capability request message, the first network node configured with an authorization to manage the second network node, and the capability request message at least inquires whether artificial intelligence (AI) capability for communication is supported in the second network node, the capability request message inquiring one or more parameters associated with the AI capability for communication supported in the second network node for computations to schedule the second network node, wherein the one or more parameters are quantized and categorized with different levels; and transmit, to the first network node, a capability report message that at least reports whether the AI capability for communication is supported in the second network node, the capability report message reporting the inquired one or more parameters that correspond to at least one level of the quantized and categorized one or more parameters.

8. The apparatus of claim 7, wherein at least one of:

the first network node is a base station and the second network node is a user equipment, or another base station; or the first network node is the user equipment and the second network node is another user equipment, or the base station.

9. The apparatus of claim 7, wherein the one or more parameters comprise at least one of:

peak floating-point operations per second (FLOPS);

peak bandwidth to access a memory per second;

memory size for an AI model, an AI task, task and input/output data;

energy consumption per operation; or a penalty of interaction with local communication modules.

10. The apparatus of claim 7, wherein the capability request message at least inquires whether the AI capability for communication is supported in the second network node by indicating a set of data and corresponding operations to the second network node, and the capability report message indicates a test result of the set of data and the corresponding operations if the AI capability for communication is supported in the second network node.

11. The apparatus of claim 7, wherein, if the AI capability for communication is supported in the second network node, the at least one processor is further configured to cause the apparatus to:

receive, from the first network node, configuration information about resources and operations for at least one AI task; and receive the at least one AI task from the first network node after transmitting an acknowledgement of the configuration information, wherein the at least one AI task comprises at least data to be processed and the operations on the data.

12. The apparatus of claim 7, further comprising an intelligent function entity including a management module, an AI computation module, and an AI memory, wherein the management module is configured to manage the AI computation module and the AI memory.

13. A method performed by a first network node in a wireless communication network, the method comprising:

transmitting, to a second network node, a capability request message, the first network node configured with an authorization to manage the second network node, and the capability request message at least inquires whether artificial intelligence (AI) capability for communication is supported in the second network node, the capability request message inquiring one or more parameters associated with the AI capability for communication supported in the second network node for computations to schedule the second network node, wherein the one or more parameters are quantized and categorized with different levels; and receiving, from the second network node, a capability report message that at least reports whether the AI capability for communication is supported in the second network node, the capability report message reporting the inquired one or more parameters that correspond to at least one level of the quantized and categorized one or more parameters.

14. The method of claim 13, wherein at least one of:

the first network node is a base station and the second network node is a user equipment, or another base station; or the first network node is the user equipment and the second network node is another user equipment, or the base station.

15. The method of claim 13, wherein the one or more parameters comprise at least one of:

peak floating-point operations per second (FLOPS);

peak bandwidth to access a memory per second;

memory size for an AI model, an AI task, and input/output data;

energy consumption per operation; or a penalty of interaction with local communication modules.

16. The method of claim 13, wherein the capability request message at least inquires whether the AI capability for communication is supported in the second network node by indicating a set of data and corresponding operations to the second network node, and the capability report message indicates a test result of the set of data and the corresponding operations if the AI capability for communication is supported in the second network node.

17. The method of claim 13, wherein, if the AI capability for communication is supported in the second network node, the method further comprising:

transmitting, to the second network node, configuration information about resources and operations for at least one AI task; and transmitting the at least one AI task to the second network node after receiving an acknowledgement of the configuration information, wherein the at least one AI task comprises at least data to be processed and the operations on the data.

18. A processor for wireless communication, comprising:

at least one controller coupled with at least one memory and configured to cause the processor to:

transmit, from a first network node to a second network node, a capability request message, the first network node configured with an authorization to manage the second network node, and the capability request message at least inquires whether artificial intelligence (AI) capability for communication is supported in the second network node, the capability request message inquiring one or more parameters associated with the AI capability for communication supported in the second network node for computations to schedule the second network node, wherein the one or more parameters are quantized and categorized with different levels; and receive, from the second network node, a capability report message that at least reports whether the AI capability for communication is supported in the second network node, the capability report message reporting the inquired one or more parameters that correspond to at least one level of the quantized and categorized one or more parameters.

19. The processor of claim 18, wherein the one or more parameters comprise at least one of:

peak floating-point operations per second (FLOPS);

peak bandwidth to access a memory per second;

memory size for an AI model, an AI task, and input/output data;

energy consumption per operation; or a penalty of interaction with local communication modules.

20. The processor of claim 18, wherein the capability request message at least inquires whether the AI capability for communication is supported in the second network node by indicating a set of data and corresponding operations to the second network node, and the capability report message indicates a test result of the set of data and the corresponding operations if the AI capability for communication is supported in the second network node.

* * * * *